March 31, 1931.   P. A. BECK   1,798,137
LOAD DISCHARGING MEANS FOR AIRPLANES
Filed Dec. 15, 1927   3 Sheets-Sheet 3
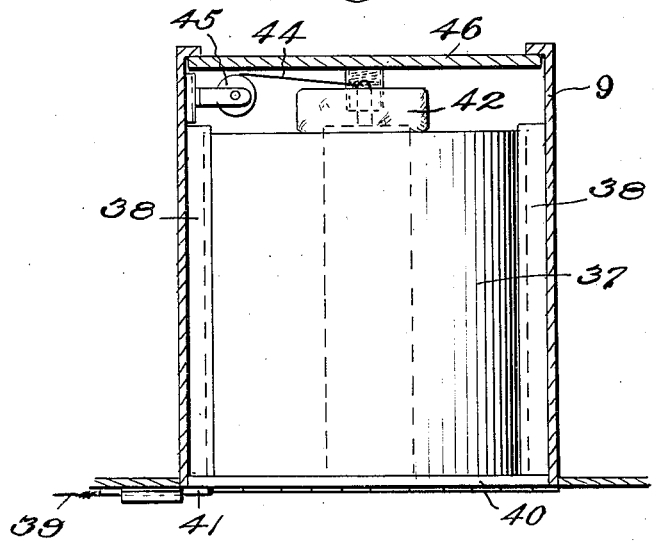
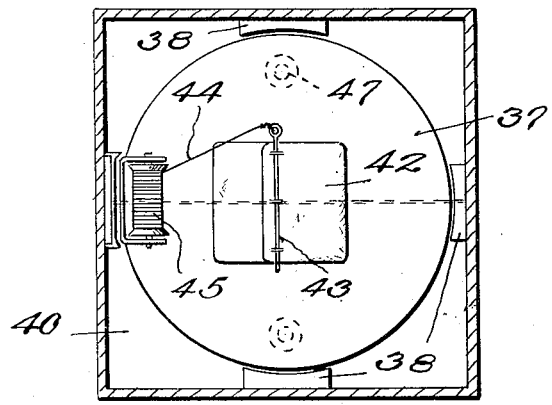
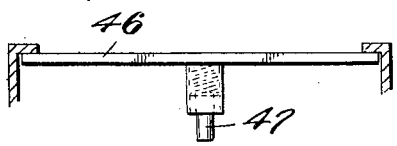
Inventor
PETER A. BECK,
By
Attorney Patented Mar. 31, 1931

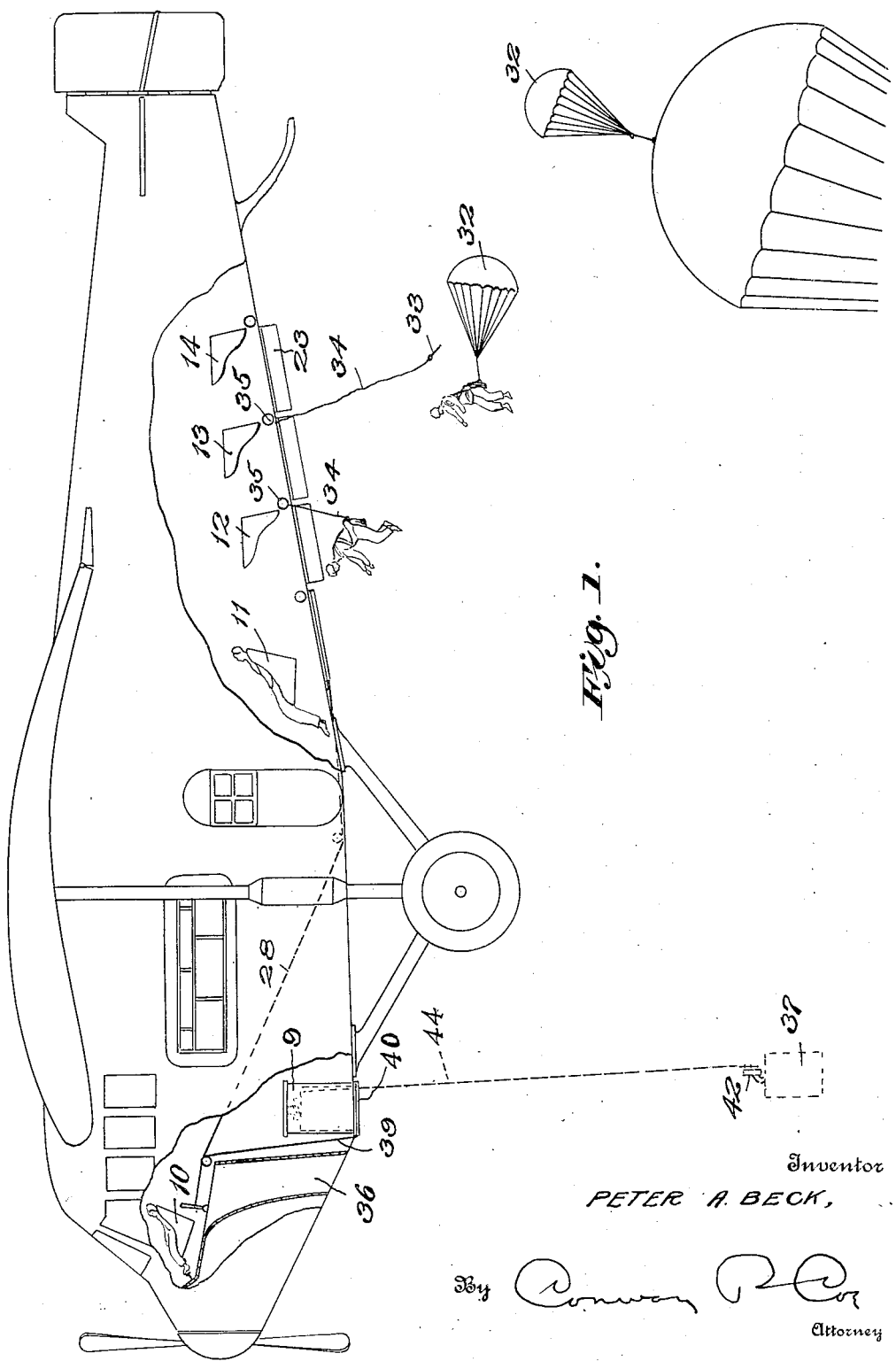

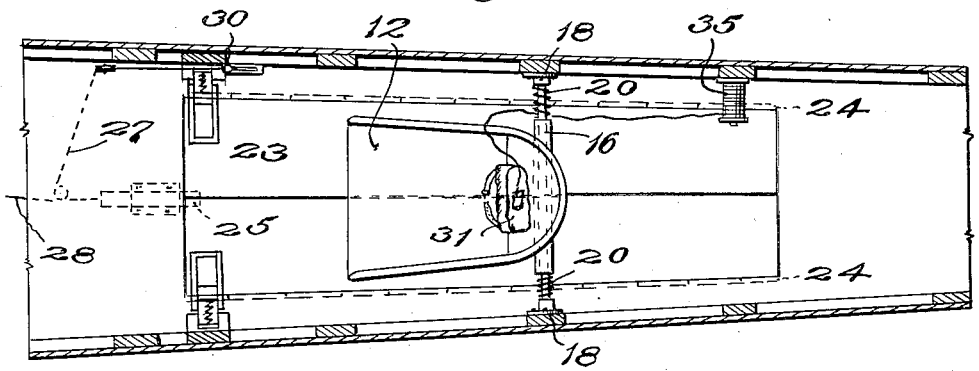
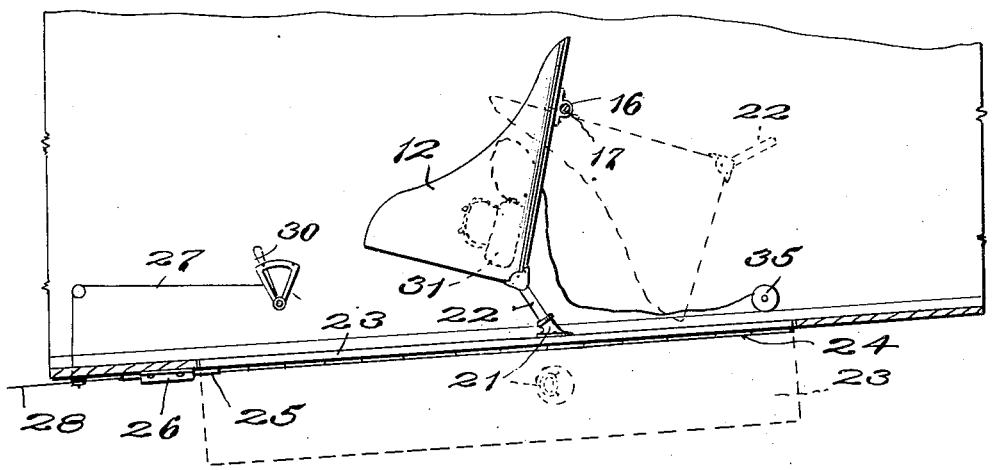
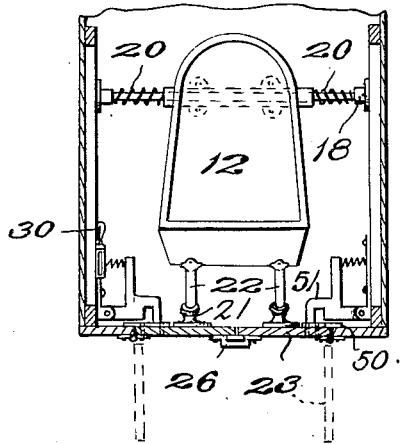

1,798,137

UNITED STATES PATENT OFFICE

PETER A. BECK, OF ROCK SPRINGS, WYOMING

LOAD-DISCHARGING MEANS FOR AIRPLANES

Application filed December 15, 1927. Serial No. 240,260.

This invention relates to means for discharging the cargo, passengers, and crew from airplanes, and more particularly to means whereby any or all of said cargo, passengers, and crew may be automatically dropped from the plane in parachutes while the plane is in flight, whenever such action may become necessary, as in case of fire or other emergency or in the regular course, as where mail containers or passengers are dropped at predetermined points.

An object of the invention is to improve this type of apparatus, and to provide means whereby such discharge may be effected with a minimum of disturbance to the plane and danger to the persons or articles dropped.

A further object is the provision of substantially automatic apparatus whereby a person may be safely dropped from the plane and launched in the parachute without the necessity for any, or at most, only the simplest acts on his part, whereby the apparatus is adapted to take care of passengers who are wholly unskilled in parachute jumping.

A further object of the invention is to provide means whereby the release of the cargo and passengers is effected from one point in the plane, preferably the pilot's seat, so that a panic-stricken passenger may, in an emergency, be safely dropped without the necessity for any act on his part.

Further objects will be apparent from the following description, taken in connection with the accompanying drawings, in which Fig. 1 is a side elevation, partly in section, of an airplane embodying the invention, different units of the load-discharging apparatus being shown in various stages of operation;

Fig. 2 is a plan view of one of the passenger seats and its related structure;

Fig. 3 is a side elevation of the same;

Fig. 4 is a front elevation of the same;

Fig. 5 is a side elevation showing the interior of the cargo compartment with a mail container in position therein;

Fig. 6 is a plan view of the same, with the cover of the compartment removed; and Fig. 7 is a detail view of the cargo compartment cover.

The airplane shown in Fig. 1 may be of any usual design, and is provided with a pilot's seat 10, a compartment 9 for mail or other cargo, and seats 11, 12, 13 and 14 for passengers.

Each of the passenger's seats is supported by means of a sleeve 16 rotatably mounted on a rod 17 fixed to the frame 18 of the plane. Coiled springs 20 engage the sleeve 16 and the frame 18 and are given an initial tension to make them tend to turn the seat in the counter-clockwise direction as viewed in Fig. 3. This tendency is resisted by means of abutments 21 which bear against rods 22 fixed to the bottom of the seat.

The floor beneath each seat comprises a pair of comparatively thin trap doors 23 hung at their outer edges, preferably by means of piano hinges 24. The trap doors are normally held in position by a release bar 25 which is slidably mounted in a bracket 26 and actuated by either of two cables 27 and 28 connected thereto. Cable 27 is connected to a lever 30 adjacent the passenger's seat, and cable 28 extends to the pilot's seat. In particular circumstances, either cable may be omitted if desired. Doors 23 are provided with pawl and ratchet means which permit the doors to swing open, but restrain them against closing when they are once opened. When the doors swing open pawl members 50 which are carried by the doors move into a vertical position where they engage the notches of the ratchet members 51 and hold the doors open, as shown in dotted lines in Fig. 4.

Each seat is provided with a parachute 31 which should comprise a smaller pilot parachute 32. The pilot parachute is normally held in folded position by means of a pin 33 attached to a ripcord 34, and may be provided with resilient means to insure its opening when the pin is withdrawn. The other end of cord 34 is attached to the reel 35, upon which it is normally wound. The reel 35 may be fixed to the frame of the airplane, as shown, or may be secured to the seat or to one of the doors 23 if desired. It is preferably provided with suitable brakes to restrain the unwinding of the cable therefrom.

The construction of the pilot's seat is essentially the same as that of the passenger's seat above described, except that where the construction of the machine necessitates it, a chute 36 is provided through which the pilot may fall clear of the machine.

The construction of the compartment 9 is shown in Figs. 5, 6 and 7, wherein it is seen that a light rigid container 37, preferably of metal, is immovably held in the compartment by means of guide blocks 38. Container 37 is preferably formed of metal and may be adapted to be sealed and locked in order to protect its contents from fire, water and tampering. The weight of the container should be such that where it is used for mail or other light articles it will float on the water, and it may be provided with illuminating means or a flag or sound producing mechanism to facilitate its being found.

Trap doors 40 are provided beneath the compartment 9, are similar to the trap doors 23, and operate by similar releasing mechanism 41, comprising a cable 39 extending to the pilot's seat. A parachute 42 is secured to the container 37 and is designed to open when the container is discharged from the compartment, the idea being to prevent injury to persons or property on the ground, or to the container itself. Parachute 42 has a pin 43 and a ripcord 44 wound upon and attached to a reel 45 which is mounted on the inner wall of the compartment above the container. In order to prevent movement of the container relative to the compartment, the cover 46 of the compartment is provided with a pair of resiliently mounted studs 47 adapted to yieldingly bear against the upper surface of the container. These studs also insure quick ejectment of the container when the trap doors 40 are released.

In the operation of the device, the pilot may release any of the seats by pulling the proper cable 28, which allows the trap doors 23 to swing outwardly. It may here be noted that the trap doors when opened, extend in the direction of travel of the plane, so that no disturbance of the plane's equilibrium results from opening the doors. In fact, the doors 23 when open act as stabilizing fins which help to keep the plane on an even keel. When the trap doors are released, the weight of the passenger and the action of springs 20 causes the seat to swing to the position shown in dotted lines in Fig. 1, thereby allowing the passenger to drop clear of the plane. The ripcord 34 meanwhile unwinds from reel 35, and when it is entirely unwound, it withdraws pin 33, allowing the pilot parachute 32 to open. This in turn causes the main parachute to open, but not until the passenger has fallen a safe distance, say 40 feet, from the airplane.

It is obvious that the invention is not limited to the embodiment shown in the drawings, but may be applied to other types of aircraft and may be modified within the skill of those versed in the art.

Having described my invention, what I claim as new and desire to secure by Letters Patent of the United States is:

1. In an airplane, a seat pivoted adjacent the upper portion of the back thereof to swing backwardly and upwardly to discharge a passenger therefrom, door means beneath the seat pivoted on an axis extending substantially fore and aft of the plane, means cooperating with the door means to hold the seat in normal position, and means to release the door means to open same and permit rotation of the seat to discharge a passenger face downward from the plane.

2. In an airplane, a seat mounted to move under the action of gravity to discharge a passenger therefrom, a pair of doors beneath the seat pivoted on axes extending substantially fore and aft of the plane, said axes being positioned symmetrically with respect to the fore and aft center line of the plane supporting means for said seat cooperating with the doors to hold the seat in normal position, means to release the doors to allow them to swing open simultaneously and permit movement of the seat to discharge a passenger from the plane, and means to lock said doors in open position substantially parallel to the axis of the rudder of the plane.

3. In an airplane, a seat mounted to be movable to discharge a passenger therefrom, door means beneath the seat and pivoted on an axis extending substantially fore and aft of the plane, means cooperating with the door means to hold the seat in normal position, means to release the door means to allow same to swing open and permit movement of the seat to discharge a passenger from the plane, and means to lock said door means in open position to permit said door means to act as a keel for said plane.

4. In an airplane, a seat pivoted to swing backwardly and upwardly under the action of gravity to discharge a passenger face downward therefrom, a pair of doors beneath the seat pivoted on axes extending substantially fore and aft the plane, said axes being positioned symmetrically with respect to the fore and aft center line of the plane, means cooperating with the doors to hold the seat in normal position, means to hold the doors in closed position, means to release the doors to allow them to swing open and permit rotation of the seat to discharge a passenger from the plane, means to lock the doors in open position when they have once opened, and a parachute within the body of the plane and having a rip cord, said rip cord being attached to the plane whereby it operates automatically to release the parachute when the parachute has dropped a given distance beneath the plane.

5. In an airplane, the combination of an enclosed body, a seat pivoted in said body, spring means tending to swing said seat backwardly and upwardly on said pivot to discharge a passenger face downward from said seat, door means beneath said seat, supporting members extending between said door means and said seat to normally prevent the swinging of said seat on said pivot, locking means to normally hold said door closed, an operating device for said locking means whereby the pilot of an airplane may release said locking means to cause said door means to open and discharge the passenger face downward from the airplane.

6. In an airplane, the combination of an enclosed body, a pilot seat mounted in the front of said body at a substantial distance above the bottom of said body, and a chute leading from adjacent said pilot seat through the bottom of said body to enable the pilot to escape from the airplane in an emergency.

PETER A. BECK.